United States Patent
Lai et al.

(10) Patent No.: US 8,119,753 B2
(45) Date of Patent: Feb. 21, 2012

(54) SILICONE HYDROGELS WITH AMINO SURFACE GROUPS

(75) Inventors: Yu-Chin Lai, Pittsford, NY (US); Weihong Lang, Amston, CT (US)

(73) Assignee: Bausch & Lomb Incorporated, Rochester, NY (US)

( * ) Notice: Subject to any disclaimer, the term of this patent is extended or adjusted under 35 U.S.C. 154(b) by 527 days.

(21) Appl. No.: 12/242,955

(22) Filed: Oct. 1, 2008

(65) Prior Publication Data
US 2009/0103045 A1    Apr. 23, 2009

Related U.S. Application Data

(60) Provisional application No. 60/981,836, filed on Oct. 23, 2007.

(51) Int. Cl.
*C08F 30/08* (2006.01)
(52) U.S. Cl. ...................... 526/279; 525/474
(58) Field of Classification Search .............. 526/279; 525/474
See application file for complete search history.

(56) References Cited

U.S. PATENT DOCUMENTS

| | | | |
|---|---|---|---|
| 4,495,313 A | 1/1985 | Larsen | |
| 4,711,943 A | 12/1987 | Harvey, III | |
| 4,889,664 A | 12/1989 | Kindt-Larsen et al. | |
| 4,910,277 A | 3/1990 | Bambury et al. | |
| 4,954,587 A | 9/1990 | Mueller | |
| 5,010,141 A | 4/1991 | Mueller | |
| 5,039,459 A | 8/1991 | Kindt-Larsen et al. | |
| 5,070,215 A | 12/1991 | Bambury et al. | |
| 5,079,319 A | 1/1992 | Mueller | |
| 5,115,056 A | 5/1992 | Mueller et al. | |
| 5,260,000 A | 11/1993 | Nandu et al. | |
| 5,336,797 A | 8/1994 | McGee et al. | |
| 5,358,995 A | 10/1994 | Lai et al. | |
| 5,387,632 A | 2/1995 | Lai et al. | |
| 5,451,617 A | 9/1995 | Lai et al. | |
| 5,486,579 A | 1/1996 | Lai et al. | |
| 6,440,571 B1 | 8/2002 | Valint, Jr. et al. | |
| 6,599,559 B1 * | 7/2003 | McGee et al. | 427/2.24 |
| 2005/0179862 A1 * | 8/2005 | Steffen et al. | 351/160 H |
| 2006/0142525 A1 | 6/2006 | Lai et al. | |

FOREIGN PATENT DOCUMENTS

| | | |
|---|---|---|
| WO | WO 96/31792 | 10/1996 |
| WO | WO 01/71392 | 9/2001 |
| WO | WO 2007/115027 | 10/2007 |

OTHER PUBLICATIONS

International Search Report (PCT/ISA/210) and Written Opinion (PCT/ISA/237) mailed on Feb. 2, 2009.

* cited by examiner

*Primary Examiner* — Kuo-Liang Peng
(74) *Attorney, Agent, or Firm* — Glenn D. Smith; Joseph Barrera

(57) ABSTRACT

A silicone hydrogel comprising monomeric units of one or more amino monomers, wherein the amino monomers are of formula IA, IB, IIA or IIB and monomeric units of one or more silicone monomers

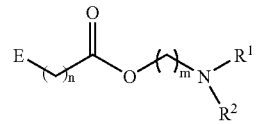

IA

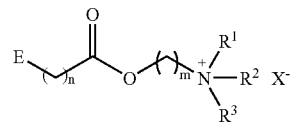

IB

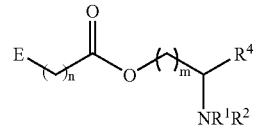

IIA

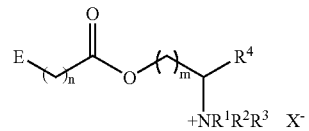

IIB wherein $R^1$, $R^2$ and $R^3$ are independently selected from hydrogen, $C_1$-$C_6$ alkyl or $CH_2OH$;
$R^4$ is a $C_1$-$C_{10}$ alkyl optionally substituted with hydroxyl or carboxylic acid;
E is a polymerizable group;
X is an anion suitable for quaternary nitrogen; and
n is 0, 1, 2, or 3 and m is an integer from 1 to 8.

8 Claims, No Drawings

SILICONE HYDROGELS WITH AMINO SURFACE GROUPS

PRIORITY CLAIMS TO PRIOR APPLICATIONS

This application claims the benefit of Provisional Patent Application No. 60/981,836 filed Oct. 23, 2007 which is incorporated by reference herein.

FIELD OF THE INVENTION

This invention relates to silicone hydrogel materials and a method of making such materials from a silicon hydrogel formulation that comprises silicone monomer and an amino monomer. This invention further relates to the use of the silicone hydrogel materials as contact lenses.

BACKGROUND OF THE INVENTION

There are many properties that need to be considered when developing a contact lens material. Optical clarity, dimensional stability, oxygen permeability, wettability and physiological compatibility are all important parameters in determining the success of any new material. The importance of the surface characteristics of material used in the manufacture of contact lenses should not be underestimated. They govern the interaction of a material with the tear film and any tendency the material may have to become deposited during wear. More importantly, the nature of the material surface can have a vital effect on comfort, wearing time and clarity of vision.

A hydrogel is a hydrated, cross-linked polymeric system that contains water in an equilibrium state. Hydrogels typically are oxygen permeable and biocompatible, making them a preferred material for producing biomedical devices, in particular, contact or intraocular lenses.

Conventional hydrogels are prepared from monomeric mixtures predominantly containing hydrophilic monomers, such as, 2-hydroxyethyl methacrylate or N-vinyl pyrrolidone. U.S. Pat. Nos. 4,495,313, 4,889,664 and 5,039,459 disclose the formation of conventional hydrogels. Oxygen permeability of these conventional hydrogel materials relates to the water content of the materials and is typically below 40 barrers. Although this relatively low level of oxygen permeability is suitable for short-term wear of contact lenses, it is insufficient for long-term wear of contact lenses (e.g. 30 days without removal).

The presence of silicone monomer in a hydrogel formulation is known to increase the oxygen permeability of the resulting hydrogel materials. Silicone hydrogel materials typically have higher oxygen permeabilities than conventional hydrogels. Silicone hydrogels are prepared from hydrogel formulations containing at least one silicone monomer and at least one hydrophilic monomer. Either the silicone monomer or the hydrophilic monomer can function as a crosslinking agent (a crosslinking agent is a monomer having multiple polymerizable functionalities). Alternatively, a separate crosslinking agent can be used. Silicone hydrogel materials are described in U.S. Pat. Nos. 4,954,587; 5,010,141; 5,079,319, 5,115,056; 5,260,000; 5,336,797; 5,358,995; 5,387,632; 5,451,617; and 5,486,579; and WO 96/31792.

In order to achieve good vision, a stable uniform tear film must be supported over the front surface of a contact lens. A lens that does not have good wetting characteristics will result in a rapid break up of the pre-lens tear film and a consequent reduction in vision quality. A stable pre-lens tear film also provides a lubricating effect, allowing comfortable lid movement over the front surface of the lens. Contact lens material surface characteristics also govern biocompatibility. A wettable contact lens material is more likely to allow a continuous tear film between the back surface of the lens and the corneal epithelium, without which no material can be considered as biocompatible. A contact lens surface with poor wettability has greater tendency to attract tear-film deposits. As the tear film dries out due to evaporation between blinking, the dry spots form areas prone to deposit formation, especially protein, and this in turn further reduces surface wettability. The clinical performance of any contact lens material is governed by its ability to form a stable pre and post-lens tear film, which in turn is governed by its wettability.

SUMMARY OF THE INVENTION

The invention is directed to a silicone hydrogel comprising monomeric units of one or more amino monomers and monomeric units of one or more silicone monomers. The amino monomers are of formula IA, IB, IIA or IIB

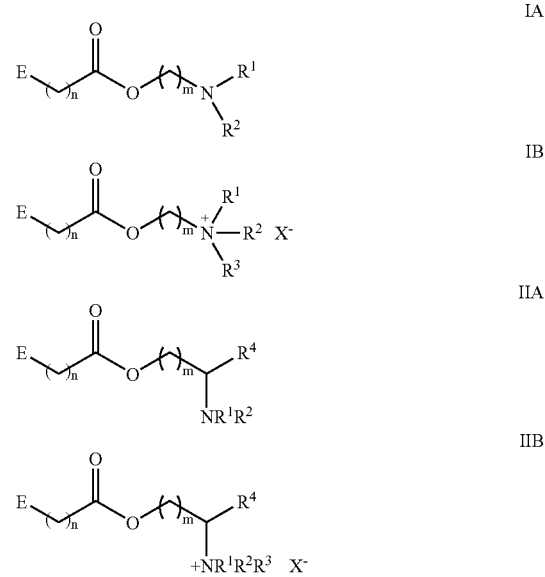

wherein $R^1$, $R^2$ and $R^3$ are independently selected from hydrogen, $C_1$-$C_6$ alkyl or $CH_2OH$;
$R^4$ is a $C_1$-$C_{10}$ alkyl optionally substituted with hydroxyl or carboxylic acid;
E is a polymerizable group;
X— is an anion suitable for quaternary nitrogen; and
n is 0, 1, 2, or 3 and m is an integer from 1 to 8.

The invention is also directed to contact lenses manufactured from the silicon hydrogel materials, and in particular, contact lenses manufactured from the silicon hydrogel materials, which subsequently coated to enhance wettability.

DETAILED DESCRIPTION OF THE INVENTION

The addition of monomer with amino functionality, hereafter, "amino monomer", to a silicon hydrogel formulation is not expected to provide any material advantages for at least a two reasons. First, any potential increase in wettability of the silicone surface with the copolymerization of the amino monomer can be accomplished with acidic monomers. Second, acrylic monomers with primary amine groups are known to be relatively unstable as a result of a Michael addition reaction between the amino group and the vinyl group of another monomer. Yet, in spite of these anticipated disadvantages, the presence of amino groups in a silicone hydrogel polymer can be very useful as an anchor for a postcure treatment of the silicon hydrogel surface either through chemical grafting or ionic interactions with hydrophilic coatings.

The invention is directed to a silicone hydrogel comprising monomeric units of one or more amino monomers and monomeric units of one or more silicone monomers. The amino monomers are of formula IA, IB, IIA or IIB

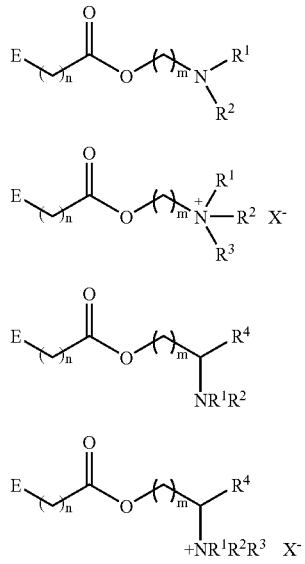

wherein $R^1$, $R^2$ and $R^3$ are independently selected from hydrogen, $C_1$-$C_6$ alkyl or $CH_2OH$;
$R^4$ is a $C_1$-$C_{10}$ alkyl optionally substituted with hydroxyl or carboxylic acid;
E is a polymerizable group;
X is an anion suitable for quaternary nitrogen; and
n is 0, 1, 2, or 3 and m is an integer from 1 to 8.

The polymerizable group E can be any carbon-carbon double bond that can polymerize if subjected to radical polymerization conditions. Examples of radical polymerizable groups include acrylate, methacrylate (we use the term "(meth)acrylate" to indicate either of these two polymerizable groups), styrl, vinyl, allyl or N-vinyl lactam.

The amino monomer is copolymerizable with any silicone monomer, examples of which are described in the application below. Applicants show that one advantage of incorporating the amino monomer into the silicon hydrogel formulation is to provide amino functionality at the surface of the silicone hydrogel. Accordingly, the modification of the silicone hydrogel surface with a hydrophilic coating is also described in this application.

An exemplary listing of amino monomers used to prepare the silicon hydrogels include, but are not limited to, dimethylaminoethyl(meth)acrylate, diethylaminoethyl(meth)acrylate, diisopropylaminoethyl(meth)acrylate, dibutylaminoethyl(meth)acrylate, dimethylaminobutyl(meth)acrylate, diethylaminohexyl(meth)acrylate, t-butylaminoethyl(meth)acrylate, isobutylamino-butyl(meth)acrylate, isobutylaminopropyl(meth)acrylate, isobutylamino-ethyl(meth)acrylate, octylamino-ethyl(meth)acrylate isohexylaminoethyl(meth)acrylate, (N-propyl-N-methyl)amino-ethyl(meth)acrylate, t-butylamino-ethyl vinyl acetate, t-butylamino-ethyl crotonate, t-butylamino-ethyl isocrotonate, N,N-dimethylamino-ethyl crotonate, N,N-diethylamino-ethyl isocrotonate, and the quaternization products of each of these compounds.

In one embodiment, the silicone hydrogel will also include monomeric units of one or more hydrophilic monomers. In another embodiment, the silicone hydrogel will include one or more high molecular weight hydrophilic polymers. The hydrophilic monomers and high molecular weight polymers are described in greater detail in this application.

As stated, the silicon hydrogel will necessarily include one or more silicon monomers. The silicone monomers that can be used include those of Structure A.

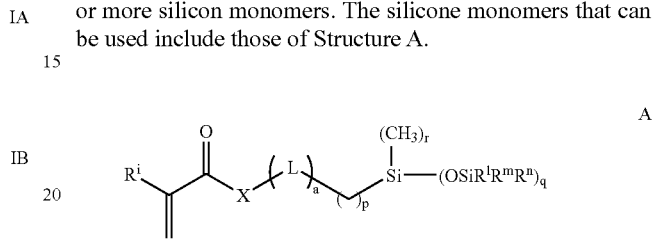

wherein $R^i$ is H or $CH_3$, q is 1 or 2 and for each q, $R^l$, $R^m$ and $R^n$ are independently selected from ethyl, methyl, benzyl, phenyl or a monovalent siloxane chain comprising from 1 to 30 repeating Si—O units, p is an integer from 1 to 10, r=(3−q), X is O, NH or N($C_{1-4}$ alkyl), a is 0 or 1, and L is a divalent linking group which preferably comprises from 2 to 5 carbons, which may also optionally comprise ether or hydroxyl groups, for example, a poly(ethylene glycol) chain.

Examples of the silicone-containing monomers of Structure A that can be used are (3-methacryloyloxypropyl)bis(trimethylsiloxy)methylsilane, (3-methacryloyloxypropyl)-pentamethyldisiloxane, (3-methacryloyloxy-2-hydroxypropyloxy)bis(trimethylsiloxy)methylsilane.
Preferred silicone-containing monomers are monomethacryloyloxyalkyl-terminated polydimethylsiloxanes ("mPDMS"), such as those shown in structure B.

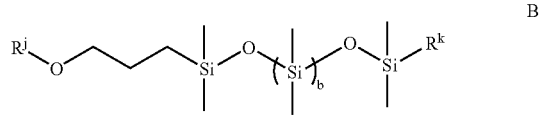

where b=0 to 100, and $R^k$ is any $C_{1-10}$ aliphatic or aromatic group which can include hetero atoms; provided that $R^k$ is not functionalized at the point at which it is bonded to Si. Preferably, $R^k$ is a $C_{3-8}$ alkyl groups with butyl groups, particularly sec-butyl groups, being most preferred. $R^j$ is an ethylenically unsaturated moiety; preferably a single polymerizable vinyl group. More preferably, $R^j$ is a methacryl moiety but it can also be an acryl or styrenic moiety or other similar moiety.

Other silicon-containing monomers that can be used include (3-methacryloxypropyl)tris(trimethylsiloxy)silane (TRIS), amide analogs of TRIS described in U.S. Pat. No. 4,711,943, and the vinylcarbamate or carbonate analogs described in U.S. Pat. No. 5,070,215.

Examples of some other silicon-containing monomers include bulky polysiloxanylalkyl(meth)acrylic monomers. An example of bulky polysiloxanylalkyl(meth)acrylic monomers are represented by Structure C:

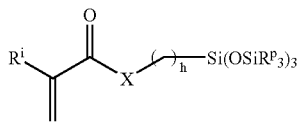
C wherein X denotes O or NR$^i$; h is an integer from 1 to 10;
each R$^i$ independently denotes hydrogen or methyl; and each R$^p$ independently denotes a lower alkyl radical or phenyl radical.

Another class of representative silicon-containing monomers includes silicone-containing vinyl carbonate or vinyl carbamate monomers such as:

1,3-bis[4-vinyloxycarbonyloxy)but-1-yl]tetramethyldisiloxane;

1,3-bis[4-vinyloxycarbonyloxy)but-1-yl]polydimethylsiloxane;

3-(trimethylsilyl)propyl vinyl carbonate;

3-(vinyloxycarbonylthio)propyl-[tris(trimethylsiloxy)silane];

3-[tris(trimethylsiloxy)silyl]propyl vinyl carbamate;

3-[tris(trimethylsiloxy)silyl]propyl allyl carbamate;

3-[tris(trimethylsiloxy)silyl]propyl vinyl carbonate;

t-butyldimethylsiloxyethyl vinyl carbonate;

trimethylsilylethyl vinyl carbonate; and trimethylsilylmethyl vinyl carbonate.

Examples of silicon-containing vinyl carbonate or vinyl carbamate monomers are represented by Structure D:

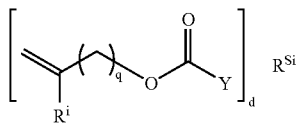
D wherein:
Y denotes O, S or NH;
R$^{Si}$ denotes a silicone-containing organic radical;
R$^i$ denotes hydrogen or methyl;
d is 1, 2, 3 or 4; and q is 0 or 1.

Suitable silicone-containing organic radicals R$^{Si}$ include the following:
—(CH$_2$)$_n$Si[(CH$_2$)$_m$CH$_3$]$_3$; —(CH$_2$)$_n$Si[OSi(CH$_2$)$_m$CH$_3$]$_3$; —(CH$_2$)Si[OSi(R$^r$)$_3$]$_3$
—(CH$_2$)$_n$[Si(Rr)$_2$O]$_e$Si(R$^r$)$_3$; and —(CH$_2$)$_n$[Si(R$^r$)$_2$O]$_e$M, wherein: M is represented by

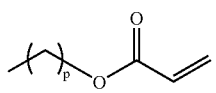

wherein p is 1 to 6;
R$^r$ denotes an alkyl radical or a fluoroalkyl radical having 1 to 6 carbon atoms;
e is an integer from 1 to 200; n is 1, 2, 3 or 4; and m is 0, 1, 2, 3, 4 or 5.

An example of a particular species within Structure D is represented by Structure E.

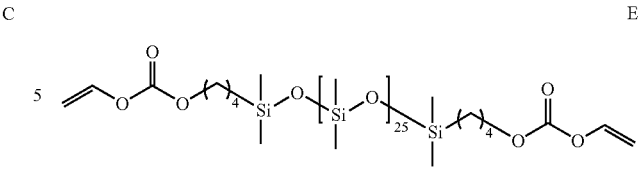
E

Another class of silicon-containing monomers includes polyurethane-polysiloxane macromonomers (also sometimes referred to as prepolymers), which may have hard-soft-hard blocks like traditional urethane elastomers. Examples of silicone urethane monomers are represented by general Formulae IV and V:

E(*D*A*D*G)$_{a}$*D*A*D*E'; or

E(*D*G*D*A)$_{a}$*D*G*D*E';

wherein:
D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

denotes a urethane or ureido linkage;
a is at least 1;
A denotes a divalent polymeric radical of Structure F:

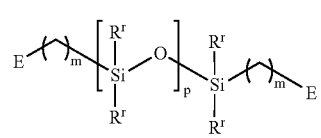
F wherein:
each R$^r$ independently denotes an alkyl or fluoro-substituted alkyl group having 1 to 6 carbon atoms which may contain ether linkages between carbon atoms;
m is at least 1; and
p is a number which provides a moiety weight of 400 to 10,000;

E denotes a polymerizable unsaturated organic radical represented by Structure G:

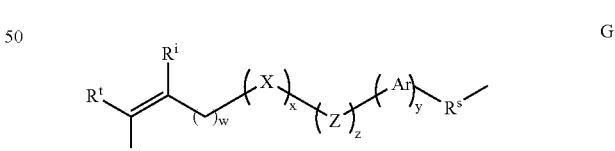
G wherein:
R$^i$ is hydrogen or methyl;
R$^t$ is hydrogen, an alkyl radical having 1 to 6 carbon atoms, or a —CO—Y—R$^u$ radical wherein Y is O, S or NH;
R$^s$ is a divalent alkylene radical having 1 to 10 carbon atoms;
R$^u$ is a alkyl radical having 1 to 12 carbon atoms;
X denotes CO or OCO;
Z denotes O or NH;
Ar denotes an aromatic radical having 6 to 30 carbon atoms;

w is an integer from 0 to 6; x is 0 or 1; y is 0 or 1; and z is 0 or 1.

An example of another silicon-containing monomer that can be combined with a silicone/epoxy-containing monomer are shown by Structure J

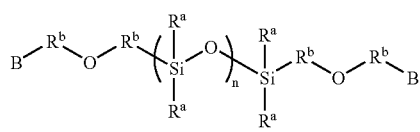

wherein B is represented by

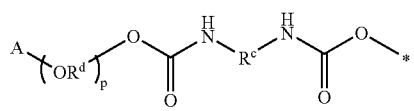

and A is represented by

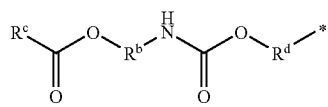

and wherein: $R^a$ independently denote a $C_1$-$C_6$ alkyl; $R^b$ independently denotes a $C_1$-$C_6$ alkylene; $R^c$ independently denote a linear or branched alkylene; $R^d$ independently denote a $C_1$-$C_2$ alkylene; $R^e$ independently denotes a $C_1$-$C_6$ alkylene; m and p are integers independently selected form the integers from 3 to 44; and n is an integer from 13 to 80, and the silicon-containing monomer has a number-average molecular weight of 2000 to 10,000.

A more specific example of a silicone-containing urethane monomer is represented by Structure H.

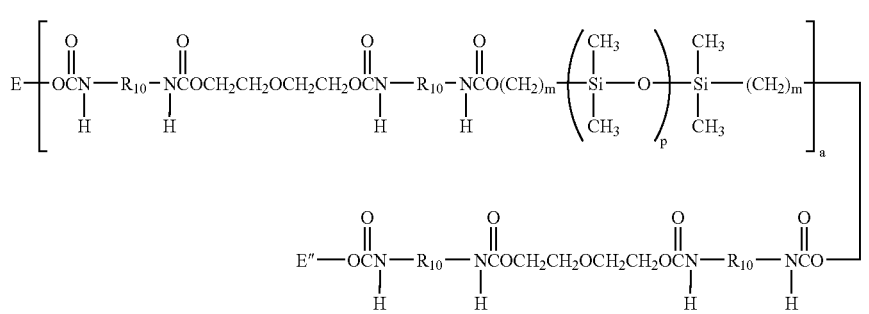

wherein m is at least 1 and is preferably 3 or 4, a is at least 1 and preferably is 1, p is an integer which provides a moiety weight of 400 to 10,000 and is preferably at least 30, $R_{10}$ is a diradical of a diisocyanate after removal of the isocyanate group, such as the diradical of isophorone diisocyanate, and each E" is a group represented by:

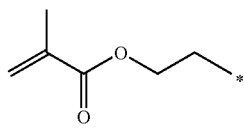

Another specific example of a silicone-containing urethane monomer is represented by Structure P-Q-P, wherein P is Q is j, k and m are independent integers from 1 to 6, preferably integers from 2 to 4, 1 is an integer from 2 to 10 and m is an integer from 4 to 50; $R_1$ is an aliphatic diradical selected from $C_2$-$C_{10}$ alkylene, alkylene with an in-chain $C_5$-$C_6$ cycloalkyl, or alkylene with an in-chain phenyl.

A particular silicone monomer that is said to have better polymerization compatibility with other silicone monomers as well as some of the more common hydrophilic monomers (see below) are linear or branched hydroxyalkylamine-functional silicone-containing monomer. The hydroxyalkylamine-functional silicone-containing monomer preferably is a block or random monomer of formula J wherein:

n is 0 to 500 and m is 0 to 500 and (n+m) is from 10 to 500 and more preferably 20 to 250;

$R^2$, $R^4$, $R^5$, $R^6$ and $R^7$ are independently a monovalent alkyl, or aryl group, which may be further substituted with alcohol, ester, amine, ketone, carboxylic acid or ether groups, preferably unsubstituted monovalent alkyl or aryl groups;

$R^1$, $R^3$ and $R^8$ are independently a monovalent alkyl, or aryl group, which may be further substituted with an alcohol, ester, amine, ketone, carboxylic acid or ether group, preferably unsubstituted monovalent alkyl or aryl groups, or have the following nitrogen-containing structure:

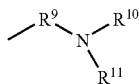

with the proviso that at least one of $R^1$, $R^3$, and $R^8$ are according to the structure above wherein $R^9$ is a divalent alkyl group such as $-(CH_2)_s-$ where s is from 1 to 10, preferably 3 to 6;

$R^{10}$ and $R^{11}$ are independently hydrogen, a monovalent alkyl or aryl group which may be further substituted with an alcohol, ester, amine, ketone, carboxylic acid or ether group, or have the following structure:

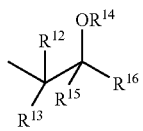

where $R^{14}$ is hydrogen, or a monovalent polymerizable group comprising acryloyl, methacryloyl, styryl, vinyl, allyl or N-vinyl lactam, preferably H or methacryloyl;

$R^{16}$ is either hydrogen, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam, preferably alkyl substituted with an alcohol or methacrylate;

$R^{12}$, $R^{13}$ and $R^{15}$ are independently hydrogen, a monovalent alkyl or aryl, which can be further substituted with alcohol, ester, amine, ketone, carboxylic acid or ether groups, or $R^{12}$ and $R^{15}$, or $R^{15}$ and $R^{13}$ can be bonded together to form a ring structure, with the proviso that at least one, preferably at least two, of the groups on the monomer comprise polymerizable groups, and $R^{12}$, $R^{13}$ and $R^{15}$ are preferably hydrogen.

The silicone hydrogels following hydration will typically comprise from 10 to 60 wt % water, or 25 to 50 wt % water, based on the total weight of the silicone hydrogel.

The silicon hydrogel materials can also be characterized as having low haze, good wettability and modulus. Haze is measured by placing test lenses in saline in a clear cell above a black background, illuminating from below with a fiber optic lamp at an angle 66° normal to the lens cell, and capturing an image of the lens from above with a video camera. The background-subtracted scattered light image is quantitatively analyzed, by integrating over the central 10 mm of the lens, and then compared to a −1.00 diopter CSI Thin Lens®, which is arbitrarily set at a haze value of 100, with no lens set as a haze value of 0.

Wettability is measured by measuring the dynamic contact angle or DCA at 23° C. with borate buffered saline. The wetting force between the lens surface and borate buffered saline is measured using a Wilhelmy microbalance while the sample is being immersed into or pulled out of the saline. The following equation is used $$F = 2\gamma\rho \cos\theta$$

where F is the wetting force, $\gamma$ is the surface tension of the probe liquid, $\rho$ is the perimeter of the sample at the meniscus and $\theta$ is the contact angle. Typically, two contact angles are obtained from a dynamic wetting experiment, i.e., the advancing contact angle and the receding contact angle. The advancing contact angle is obtained from the portion of the wetting experiment where the sample is being immersed into the test liquid.

The silicon hydrogel materials have a modulus of at least about 30 psi, preferably from 30 psi to 110 psi, or between 40 psi and 70 psi. Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Tensile modulus is measured at the initial linear portion of the stress/strain curve.

The silicon hydrogel materials have $O_2$ Dk values between 40 barrer and 300 barrer, determined by the polarographic method. Lenses are positioned on the sensor then covered on the upper side with a mesh support. The lens is exposed to an atmosphere of humidified 21 wt % oxygen. The oxygen that diffuses through the lens is measured using a polarographic oxygen sensor consisting of a 4 mm diameter gold cathode and a silver ring anode. The reference values are Balafilcon A lenses (Bausch & Lomb) which have a Dk value of about 80 barrer.

As stated, the silicon hydrogels are likely to include monomeric units of one or more hydrophilic monomers. The hydrophilic monomers are added to the silicon hydrogel formulation which also includes one or more silicone monomers and one or more amino monomers. The hydrophilic monomers can be any of the known monomers used in the prior art to make silicone hydrogels. The preferred hydrophilic monomers may be either acrylic- or vinyl-containing. Such hydrophilic monomers may themselves be used as crosslinking agents. The term "vinyl-type" or "vinyl-containing" monomers refers to monomers containing the vinyl grouping ($-CH=CH_2$) and are generally highly reactive. Such hydrophilic vinyl-containing monomers are known to polymerize relatively easily. Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, and N-vinyl formamide. NVP is one of the more preferred hydrophilic monomers. Examples of (meth)acrylic-type monomers that can be used include N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Other hydrophilic monomers that can be used include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, incorporated herein by reference, and the hydrophilic oxazolone anonomers disclosed in U.S. Pat. No. 4,910, 277, incorporated herein by reference. Other suitable hydrophilic monomers will be apparent to one skilled in the art.

An exemplary list of hydrophilic monomers used to prepare silicone hydrogel materials include N,N-dimethyl acrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid and acrylic acid. The more preferred hydrophilic monomers are selected from the group consisting of DMA, HEMA and NVP. DMA is the most preferred.

Alternatively, rather than copolymerizing any one of the above hydrophilic monomers with the silicone monomer and the amino monomer, one can polymerize the silicon and amino monomer with a high molecular weight hydrophilic polymer. As used herein, the term "high molecular weight hydrophilic polymer" refers to substances having a weight average molecular weight of no less than 100,000 Daltons. The high molecular weight hydrophilic essentially becomes incorporated within the silicone hydrogel, and provides an increase in the wettability of the hydrogel. The preferred weight average molecular weight of these high molecular weight hydrophilic polymer is between 300,000 to 1,800,000 Daltons, or between 500,000 to 1,500,000 Daltons.

Suitable amounts of high molecular weight hydrophilic polymer include from 1 wt. % to 15 wt. %, or from 3 wt. % to 15 wt. %, based upon the total of all polymeric and monomeric components used to prepare the hydrogel.

Examples of high molecular weight hydrophilic polymers include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic prepolymers made from DMA or n-vinyl pyrrolidone with glycidyl methacrylate may also be used. The glycidyl methacrylate ring can be opened to give a diol which may be used in conjunction with other hydrophilic prepolymer in a mixed system to increase the compatibility of the high molecular weight hydrophilic polymer, hydroxyl-functionalized silicone containing monomer and any other groups which impart compatibility. The preferred high molecular weight hydrophilic polymers are those that contain a cyclic moiety in their backbone, more preferably, a cyclic amide or cyclic imide. High molecular weight hydrophilic polymers include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl4,5-dimethyl-2-pyrrolidone, polyvinylimidazole, poly-N-N-dimethylacrylamide, polyvinyl alcohol, polyacrylic acid, polyethylene oxide, poly 2 ethyl oxazoline, heparin polysaccharides, polysaccharides, mixtures and copolymers (including block or random, branched, multichain, comb-shaped or star shaped) thereof where poly-N-vinylpyrrolidone (PVP) is particularly preferred. Copolymers might also be used such as graft copolymers of PVP.

The silicon hydrogel polymer can be cast into shaped articles, such as contact lenses or intraocular lenses, by conventional methods commonly used in polymerizing ethylenically unsaturated monomeric materials. As one example, a liquid or semi-liquid mixture containing the prepolymer may be charged to a mold of the desired shape, followed by polymerizing (or curing) the mixture in the mold. Various processes are known for curing a monomeric mixture in the production of contact lenses, including spincasting and static casting. Spincasting methods involve charging the monomer mixture to a mold, and spinning the mold in a controlled manner while exposing the monomer mixture to a light source such as UV light. Static casting methods involve charging the monomer mixture between two mold sections, one mold section shaped to form the anterior lens surface and the other mold section shaped to form the posterior lens surface, and curing the monomer mixture. Other known methods involve forming articles in the form of buttons (or blanks) and then lathe cutting the buttons into lenses.

Polymerization may be facilitated by exposing the mixture to heat and/or radiation, such as ultraviolet light, visible light, or high energy radiation. A polymerization initiator may be included in the mixture to facilitate the polymerization step. Representative free radical thermal polymerization initiators are organic peroxides, such as acetal peroxide, lauroyl peroxide, decanoyl peroxide, stearoyl peroxide, benzoyl peroxide, tertiarylbutyl peroxypivalate, peroxydicarbonate, and the like. Representative UV initiators are those known in the field such as, benzoin methyl ether, benzoin ethyl ether, Darocure 1173, 1164, 2273, 1116, 2959, 3331 (EM Industries) and Igracure 651 and 184 (Ciba Specialty Chemicals), and the like. Generally, the initiator will be employed in the monomeric mixture at a concentration of about 0.01 to 1 percent by weight of the total mixture.

When used in the formation of contact lenses, it is preferred that the silicone polymers, when hydrated, form hydrogels having water contents of at least 5 wt % and more preferably at least 10 wt %. Furthermore, it is preferred that such hydrogels have a Young's modulus of elasticity from 20 g/mm$^2$ to 150 g/mm$^2$, more likely from 30 g/mm$^2$ to about 110 g/mm$^2$, and a tear strength of at least 2 g/mm.

As proposed above, one advantage of adding amino monomer to the silicone hydrogel formulation is to provide a greater concentration of reactive amino functionality on the surface of a silicon hydrogel contact lens. The greater concentration of amino functionality at the surface allows one to increase the hydrophilic character of the silicone hydrogel surface by attaching a hydrophilic polymer or hydrophilic copolymer, hereafter, a hydrophilic coating. The hydrophilic polymers or copolymers (inclusive of oligomers) will have group functionality complementary to the amine functionality on the surface of the silicone hydrogel. For example, the hydrophilic polymers or copolymers can include ring-opening, carboxyl or isocyanate functionalities. In other words, amino functionality at the surface of the silicone hydrogel is used to covalently attach, or through ionic interactions, the hydrophilic coating. The hydrophilic copolymer can include monomeric units of hydrophobic monomeric units as well in order to selectively adjust the hydrophilic character of the surface.

Alternatively, a mixture of hydrophilic polymers can be used to coat the surface of the silicone hydrogel. For example, the hydrophilic coating can be prepared by the reaction of a mixture of hydrophilic polymers that includes; first, hydrophilic polymer that has group functionality complementary to the amino functionality on the surface, and, a second hydrophilic polymer that has group functionality that is complementary to secondary groups of the first hydrophilic polymer. Alternatively, a mixture of select concentration of each hydrophilic polymer can be used to coat the surface in a competitive type coating process. For example, hydrophilic polymer mixture comprising an epoxy-functional polymer and an acid-functional polymer, either simultaneously or sequentially applied to the silicon hydrogel can provide a relatively robust hydrophilic coating.

Hydrophilic coating polymer can be aprotic types such as acrylamides (e.g., N,N-dimethylacrylamide, (DMA)), lactams such as N-vinylpyrrolidinone, and poly(alklylene oxides) such as methoxypolyoxyethylene methacrylates or may be protic types such as methacrylic acid or hydroxyalkyl methacrylates such as hydroxyethyl methacrylate. Hydrophilic monomers may also include zwitterions such as N,N-dimethyl-N-methacryloxyethyl-N-(3-sulfopropyl)-ammonium betain (SPE) and N,N-dimethyl-N-methacrylamidopropyl-N-(3-sulfopropyl)-ammonium betain (SPP).

The hydrophilic copolymer can include non-reactive, hydrophilic monomeric units to further adjust the hydrophilic surface character of the silicone polymer, Exemplary monomeric units with in the hydrophilic copolymer include vinyl monomers such as 2-hydroxyethyl-; 2- and 3-hydroxypropyl-; 2,3-dihydroxypropyl-; polyethoxyethyl-; and polyethoxypropylacrylates, methacrylates, acrylamides and methacrylamides; acrylamide, methacrylamide, N-methylacrylamide, N-methylmethacrylamide, N,N-dimethylacrylamide, N,N-dimethylmethacrylamide, N,N-dimethyl- and N,N-diethyl-aminoethyl acrylate and methacrylate and the corresponding acrylamides and methacrylamides; 2- and 4-vinylpyridine; 4- and 2-methyl-5-vinylpyridine; N-methyl-4-vinylpiperidine; 2-methyl-1-vinylimidazole; N,-N-dimethylallylamine; dimethylaminoethyl vinyl ether and N-vinylpyrrolidone.

Other hydrophilic polymer coatings can be used and these are described in U.S. Patent No. 6,440,571.

As stated, a hydrophilic copolymer that includes hydrophobic monomeric units can be used in amounts up to 25 mole percent of the copolymer. Examples of hydrophobic monomeric units include: methyl, ethyl, propyl, isopropyl, butyl, ethoxyethyl, methoxyethyl, ethoxypropyl, phenyl, benzyl, cyclohexyl, hexafluoroisopropyl, or n-octyl-acrylates and -methacrylates as well as the corresponding acrylamides and methacrylamides; dimethyl fumarate, dimethyl maleate, diethyl fumarate, methyl vinyl ether, ethoxyethyl vinyl ether, vinyl acetate, vinyl propionate, vinyl benzoate, acrylonitrile, styrene, alpha-methylstyrene, 1-hexene, vinyl chloride, vinyl methylketone, vinyl stearate, 2-hexene and 2-ethylhexyl methacrylate.

The hydrophilic reactive polymer can include monomeric units with azlactone-functional, epoxy-functional and acid-anhydride-functional groups. For example, one epoxy-functional hydrophilic polymer for coating a silicone hydrogel is glycidyl methacrylate (GMA). In this case, the epoxy groups react with the surface amino functionality to provide an amino-alcohol linkage. Also, hydrophilic polymer with carboxylic acid or anhydride-functional groups such as methacrylic acid, acrylic acid, maleic anhydride and itaconic anhydride can react with the surface amino functionality to form amido linkages. Likewise, azlactone or isocyanate-functional groups of the hydrophilic polymers can similarly react with the surface amino functionality in the presence of a catalyst.

The hydrophilic polymers and copolymers are prepared in a manner known per se from the corresponding monomers (the term monomer here also including a macromer) by a polymerization reaction customary to the person skilled in the art. The polymerization can be conducted in the presence or absence of a solvent.

The surface of the silicone hydrogel can be exposed to the hydrophilic coating polymers by immersing the silicone hydrogel in a solution (solvent can be acetonitrile) containing the polymers. For example, a silicone hydrogel contact lens can be contacted with this solution for a suitable period of time.

In particular, Applicants have found it to be very convenient from a process manufacturing perspective to coat the silicone hydrogel materials with amino functionality by autoclaving the silicone hydrogels in the presence of the hydrophilic polymer or hydrophilic copolymers. The autoclaving process is typically used in contact lens manufacturing to sterilize the materials within their packaging.

For example, in one embodiment the silicone hydrogel materials are removed from their cast molds, extracted with a suitable solvent and hydrated. The hydrogels are submerged in an aqueous solution containing the hydrophilic polymer/copolymer and then subjected to autoclave conditions for at least 5 minutes, preferably at least 20 minutes. It is preferred that the aqueous solution containing the hydrophilic polymer/copolymer is at a slightly acidic pH. The coated silicone hydrogels are then rinsed with water to remove an non-adhered polymer/copolymer and positioned in their packaging with borate buffered saline. The lens package is sealed and again the lenses are subject to an autoclave conditions.

As an illustration of the present invention, examples are provided below. These examples serve only to further illustrate various preferred embodiments of the invention and should not be construed as limiting the invention.

EXAMPLES

14D6S5H is a prepolymer having a formula of HEMA-IPDI-(PDMS5000-IPDI-DEG-IPDI)$_4$(PDMS5000-IPDI)$_2$-HEMA, wherein IPDI is isophoronediisocyanate, PDMS5000 is polydimethysiloxane having a molecular weight of 5000, and DEG is diethylene glycol. The prepolymer is prepared according to the procedure described in U.S. patent application Ser. No. 11/292,877, filed Dec. 2, 2005 (US Pub. 20060142525).

HEMA-VC: 2-hydroxyethyl methacrylate vinylcarbamate
IMVT: 1,4-bis(2-metharylamido)anthraquinone
TBAEM: t-butylaminoethyl methacrylate
NVP: 1-vinyl-2-pyrrolidone
TRIS: methacryloxypropyltris9trimethylsiloxy)silane
HEMA: 2-hydroxyethyl methacrylate
IMVT: 1,4-bis[4-(2-methacryloxyethyl)phenylamino]anthraquinone
TBAEM: t-butylaminoethyl methacrylate
Contact Angle Measurements Contact angles were determined with a VCA 2500 XE Video Contact Angle System from AST Products. The system utilizes a digitally controlled 100 µl syringe to form and dispense a 0.6 µl water droplet onto the sample surface. A digital image of the water droplet coupled to the sample surface was captured using a PC based Imaging Technology Inc. frame grabber board running on Windows XP. The water used for all contact angle analysis was HPLC grade purity obtained from Fisher Scientific having a surface tension of 72 (±1) dynes/cm.

Example 1

A silicon hydrogel formulation comprising 14D5S4H/TRIS/HEMA/NVP/HEMA-VC/Darocur™ 1173)/n- hexanol/TBAEM/IMVT with a weight ratio of 53/15/5/33/1/1/10/0.5/10/1/(150 ppm), respectively, was prepared and filtered through a five micron filter. The formulation was used to cast lenses from polypropylene molds (about 40 µL was needed for each lens). The formulation was cured by exposure to UV light for one hour. Lenses were released from the molds, extracted with isopropanol overnight, and then hydrated in deionized water.

Example 2

The same procedure as described in Example 1 except that 5 parts of TBAEM was used in the silicone hydrogel formulation.

Comparative Example 1

The same procedure as described in Example 1 except that the TBAEM was not present in the silicone hydrogel formulation.

Copolymer Coatings
Copolymer A: (DMA/VDMO)

Dimethylacrylamide (DMA), 16 g; Vinyl-4,4-dimethyl-2-oxazolin-5-one (VDMO), 4 g; and VAZO-64 initiator, 0.031 g; toluene 200 mL. All ingredients except VAZO-64 were placed in a 500-ml round-bottom flask equipped with a magnetic stirrer, condenser, argon blanket, and thermo-controller. The above was deaerated with argon for 30 min. After VAZO-64 was added, the solution was heated to 60° C. and maintained for 50 hrs. After the reaction was complete as monitored by FTIR (Fourier Transform Infrared spectroscopy), the solution was slowly added to 2500 ml of diethyl ether to precipitate the polymer. The mixture was stirred 10 min, allowed to settle 10 min, and filtered. The precipitate was dried under vacuum at 30 to 35° C. overnight, and the molecular weight determined to be Mn=19448, Mw=43548 and Pd=2.25, all based on polystyrene standards. (Pd refers to polydispersity.)

Copolymer B: (DMA/GMA)

To a 1-liter reaction flask were added distilled N,N-dimethylacrylamide (DMA, 48 g, 0.48 moles), distilled glycidyl methacrylate (GM, 12 g, 0.08 moles), Vazo-64 (AIBN, 0.096 g, 0.0006 moles) and toluene (600 ml). The reaction vessel was fitted with a magnetic stirrer, condenser, thermal controller, and a nitrogen inlet. Nitrogen was bubbled through the solution for 15 min to remove any dissolved oxygen. The reaction flask was then heated to 60° C. under a passive blanket of nitrogen for 20 hours. The reaction mixture was then added slowly to 6 liters of ethyl ether with good mechanical stirring. The hydrophilic copolymer precipitated and was collected by vacuum filtration. The solid was placed in a vacuum oven at 30° C. overnight to remove the ether leaving 50.1 g of hydrophilic copolymer (83% yield). The hydrophilic copolymer was placed in a desicciator for storage until use.

Copolymer C: DMA/MAA

To a 500 ml reaction flask were added distilled N,N-dimethylacralamide (DMA, 16 g, 0.16 moles), methacrylic acid (MAA, 4 g, 0.05 moles) Vazo-64 (AIBN, 0.033 g, 0.0002 moles) and anhydrous 2-propanol (300 ml). The reaction vessel was fitted with a magnetic stirrer, condenser, thermal controller, and nitrogen inlet. Nitrogen was bubbled through the solution for 15 minutes to remove any dissolved oxygen. The reaction flask was then heated to 60° C. under a passive blanket of nitrogen for 72 hours. The reaction mixture was then added slowly to 3 liters of ethyl ether with good mechanical stirring. The hydrophilic copolymer precipitated and was collected by vacuum filtration. The solid was placed in a vacuum oven at 30° C. overnight to remove the ether leaving 9.5 g of hydrophilic copolymer (48% yield). The hydrophilic copolymer was placed in a desicciator for storage until use.

Copolymer D: (GMA/AA)

A 250-ml three-neck flask was equipped with a stirrer and a condenser. The flask was immersed in an oil bath. Into this flask were added 100 ml of deionized water, 6.207 g (or 38.75 mmol) of glyceryl methacrylate, 1.385 g (or 19.22 mmol) of acrylic acid and 0.090 g (or 0.55 mmol) of AIBN polymerization initiator. The contents of the flask were bubbled with nitrogen vigorously for 20 minutes while under stirring, then the nitrogen flow was turned to a lower rate. The contents of the flask were heated to and kept at 70° C. under nitrogen purging for two days. The copolymer was saved as a 3% (by weight) solution in deionized water.

Copolymer E: (NVP/AA)

A 250-ml three-neck flask was equipped with a stirrer and a condenser. The flask was immersed in an oil bath. To this flask was added 400 ml of deionized water, 1.889 g of NVP, 0.9498 g of acrylic acid and 0.0290 g of AIBN polymerization initiator. The contents of the flask were stirred and bubbled vigorously with nitrogen for 20 minutes. The nitrogen flow was reduced and the flask was heated to and maintained at 65° C. under nitrogen for two days. To the resulting viscous copolymer was added a caustic solution (total of 0.67 g (16.75 mmole) of NaOH) with stirring. The flask was placed upon a rotary evaporator to remove much of the water. The copolymer was stored as a 3% (by weight) solution in deionized water.

Example 3

Silicone hydrogel lenses prepared according to Examples 1, 2 and Comparative Example 1 were autoclaved in deionized water for 30 minutes. A portion of these lenses were submerged in vials containing the 3 wt. % copolymer D solution and autoclaved under different conditions (see below). Lenses were then washed with deionized water, dried and measured for contact angles. The contact angle for each of the lenses was determined for following each autoclave condition. See, Table 1.

Following the autoclave process in water, the lenses were divided into groups and autoclaved under the following conditions:

condition 1, 3 wt % copolymer D (pH about 3 to 4, 30 mins);
condition 2, 3 wt % copolymer D (pH of 8.5, 30 mins);
condition 3, 3 wt % copolymer D (pH about 3 to 4, 60 mins) followed by autoclave in BBS (borate buffered saline) for 30 mins;
condition 4, 3 wt % copolymer D (pH about 3 to 4, 90 mins); and
condition 5, 3 wt % copolymer D (pH about 3 to 4, 90 mins) followed by autoclave in BBS for 30 mins;

Following each of the above autoclave conditions, the lenses were soaked with deionized water to remove any lingering (not attached) copolymer or saline and dried. The contact angles for each of the treated lenses were determined and are reported in Table 1.

The contact angle data of Table 1 indicates that a silicon hydrogel lens material prepared with 1 part or 5 parts amino monomer (TBAEM) in the formulation provides little or no change in surface wettability of the cured lens. Following autoclave condition in water for 30 minutes the contact angles for all three lenses is about 110°. Coating of the lens materials of Examples 1 and 2 with copolymer D, and following select autoclave conditions, did provide a difference in surface wettability (greater hydrophilic character) as indicated by the drop in contact angle compared to the control (a coated Comparative Ex. 1). The autoclave condition is believed to initiate complex formation or a covalent interaction between the lens surface with amino functionality and the polymer coating. There is little or no observed difference whether the lens is autoclaved for 30 minutes versus 90 minutes in the presence of copolymer D as to the extent the copolymer adheres to the lens surface (see, conditions 1 and 4, Ex. 1). Nor is there any appreciable difference in the contact angles with respect to the amount of amino monomer in the silicon hydrogel formulation (see, compare conditions 1 and 4 for Ex. 1 and Ex. 2, respectively).

TABLE 1

Contact Angles (deg.) of Coated Lens Material

| autoclave condition | Comp. Ex. 1 | Ex. 1 | Ex. 2 |
|---|---|---|---|
| water, 30 mins | 108 | 111 | 110 |
| 1 | 85 | 73 | |
| 2 | 103 | 103 | |
| 3 | 71 | 62 | |
| 4 | 85 | | 76 |
| 5 | 71 | | 57 |

The lens materials of Ex. 1 (1 part amino monomer) and Ex. 2 (5 parts amino monomer) do exhibit significantly lower contact angles (73° or 76°) as compared to Comparative Ex. 1 (lens without amino monomer, 85°). If the lens materials are additionally autoclaved in borate buffered saline (pH 7.2), the contact angle drops even more ( 62° or 57° versus 71°). Accordingly, the contact angle data demonstrate the improvement of surface wettability with hydrophilic polymer coatings by adding amino monomer to a silicone hydrogel formulation.

An aqueous, basic (pH 8.5) solution containing 3 wt. % of copolymer A was prepared. The silicon hydrogel lens materials of Examples 1 and Comparative Example 1 were placed in vials containing the basic 3 wt % copolymer solution. The soaked lens materials were autoclaved for a thirty-minute cycle. The contact angles of 103° for both Comparative Ex. 1 and Ex. 1 suggest that there was little or no complexation between the lens surface copolymer D under basic conditions. Similar results were also obtained with copolymer E.

We claim:

1. A silicone hydrogel comprising monomeric units of one or more amino monomers, wherein the amino monomers are of formula IA, IB, IIA or IIB

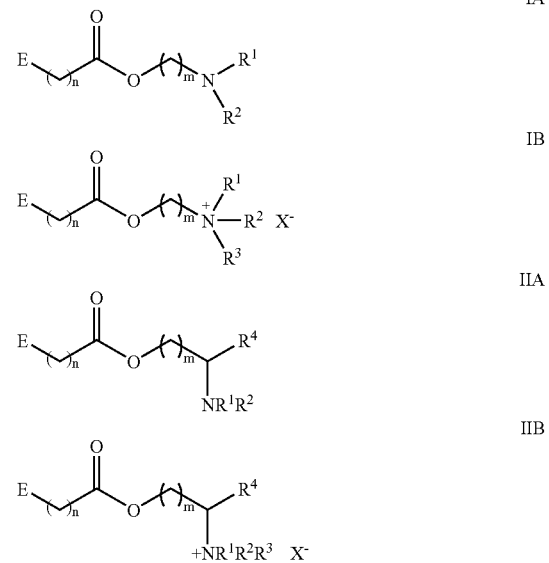

wherein $R^1$, $R^2$ and $R^3$ are independently selected from hydrogen, $C_1$-$C_6$alkyl or $CH_2OH$;

$R^4$ is a $C_1$-$C_{10}$alkyl optionally substituted with hydroxyl or carboxylic acid;

E is a polymerizable group;

X is an anion suitable for quaternary nitrogen; and n is 0, 1, 2, or 3 and m is an integer from 1 to 8 and monomeric units of one or more silicone monomers of formula P-Q-P, wherein

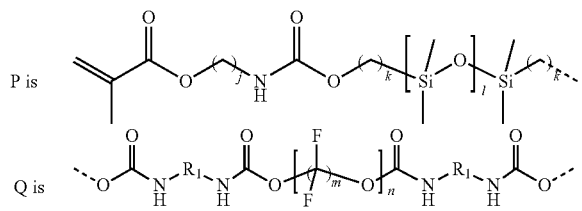

j, k and m are independent integers from 1 to 6, l is an integer from 2 to 10 and m is an integer from 4 to 50; and $R_1$ is an aliphatic diradical selected from $C_2$-$C_{10}$alkylene, alkylene with an in-chain $C_5$-$C_6$cycloalkyl, or alkylene with an in-chain phenyl.

2. The silicone hydrogel of claim 1 wherein the monomeric units of amino monomers is selected from the group consisting of dimethylaminoethyl (meth)acrylate, diethylaminoethyl (meth)acrylate, diisopropylaminoethyl (meth)acrylate, dibutylaminoethyl (meth)acrylate, dimethylaminobutyl (meth)acrylate, diethylaminohexyl (meth)acrylate, t-butylaminoethyl (meth)acrylate, isobutylamino-butyl (meth)acrylate, isobutylamino-propyl (meth)acrylate, isobutylamino-ethyl (meth)acrylate, octylamino-ethyl (meth)acrylate isohexylaminoethyl (meth)acrylate, (N-propyl-N-methyl) amino-ethyl (meth)acrylate, t-butylamino-ethyl vinyl acetate, t-butylamino-ethyl crotonate, t-butylamino-ethyl isocrotonate, N,N-dimethylamino-ethyl crotonate, N,N-diethylamino-ethyl isocrotonatc, and the quaternization products of each of these compounds.

3. The silicone hydrogel of claim 1 further comprising monomeric units of one or more hydrophilic monomers.

4. The silicone hydrogel of claim 3 wherein the monomeric units of the hydrophilic monomers is selected from the group consisting of N,N-dimethyl acrylamide, 2-hydroxyethyl methacrylate, glycerol methacrylate, 2-hydroxyethyl methacrylamide and N-vinylpyrrolidone.

5. The silicone hydrogel of claim 1 further comprising one or more high molecular weight hydrophilic polymers selected from the group consisting of poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone,and poly-N-vinyl4,5-dimethyl-2-pyrrolidone, polyvinylimidazole and poly-N-N-dimethylacrylamide.

6. A silicon hydrogel contact lens comprising a silicon hydrogel lens material with a hydrophilic surface coating, wherein the surface coating is covalently attached to the hydrogel lens material through amido linkages between amino groups on the surface of the hydrogel lens and epoxy groups or carboxylate groups of hydrophilic polymer or hydrophilic copolymer of the hydrophilic surface coating, said amino groups provided by the polymerization of amino monomers

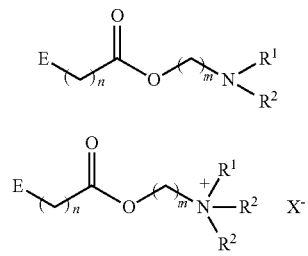

of formula IA, IB, IIA or IIB wherein $R^1$, $R^2$ and $R^3$ are independently selected from hydrogen, $C_1$-$C_6$alkyl or $CH_2OH$;

$R^4$ is a $C_1$-$C_{10}$alkyl optionally substituted with hydroxyl or carboxylic acid;

E is a polymerizable group;

X is an anion suitable for quaternary nitrogen; and n is 0, 1, 2, or 3 and m is an integer from 1 to 8 with monomeric units of one or more silicone monomers of formula P-Q-P, wherein

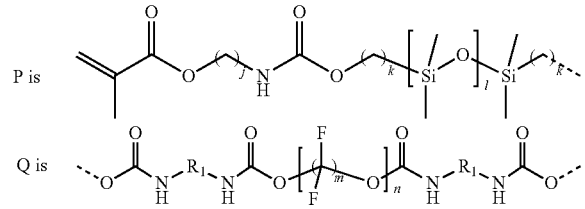

j, k and m are independent integers from 1 to 6, 1 is an integer from 2 to 10 and m is an integer from 4 to 50; and $R_1$ is an aliphatic diradical selected from $C_2$-$C_{10}$alkylene, alkylene with an in-chain $C_5$-$C_6$cycloalkyl, or alkylene with an in-chain phenyl.

7. The silicone hydrogel lens of claim 6 wherein the monomeric units of amino monomers is selected from the group consisting of dimethylaminoethyl (meth)acrylate, diethylaminoethyl (meth)acrylate, diisopropylaminoethyl (meth)acrylate, dibutylaminoethyl (meth)acrylate, dimethylaminobutyl (meth)acrylate, diethylaminohexyl (meth)acrylate, t-butylaminoethyl (meth)acrylate, isobutylamino-butyl (meth)acrylate, isobutylamino-propyl (meth)acrylate, isobutylamino-ethyl (meth)acrylate, octylamino-ethyl (meth)acrylate isohexylaminoethyl (meth)acrylate, (N-propyl-N-methyl) amino-ethyl (meth)acrylate, t-butylamino-ethyl vinyl acetate, t-butylamino-ethyl crotonate, t-butylamino-ethyl isocrotonate, N,N-dimethylamino-ethyl crotonate, N,N-diethylamino-ethyl isocrotonate, and the quatemization products of each of these compounds.

8. The silicone hydrogel lens of claim 7 wherein the silicon hydrogel lens material comprises monomeric units of one or more hydrophilic monomers selected from the group consisting of N,N-dimethyl acrylamide, 2-hydroxyethyl methacrylate, glycerol methacrylate, 2-hydroxyethyl methacrylamide and N-vinylpyrrolidone.

* * * * *